(12) United States Patent
Yukimoto et al.

(10) Patent No.: US 10,138,360 B2  
(45) Date of Patent: Nov. 27, 2018

(54) RUBBER COMPOSITION FOR VIBRATION DAMPING RUBBERS, AND VIBRATION DAMPING RUBBER

(71) Applicant: TOYO TIRE & RUBBER CO., LTD., Osaka-shi, Osaka (JP)

(72) Inventors: Naoto Yukimoto, Osaka (JP); Shuichi Tokunaga, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 56 days.

(21) Appl. No.: 15/529,228

(22) PCT Filed: Jan. 27, 2015

(86) PCT No.: PCT/JP2015/052173  
§ 371 (c)(1),  
(2) Date: May 24, 2017

(87) PCT Pub. No.: WO2016/120991  
PCT Pub. Date: Aug. 4, 2016

(65) Prior Publication Data  
US 2017/0327667 A1  Nov. 16, 2017

(51) Int. Cl.  
*C08L 7/00* (2006.01)  
*C08K 3/22* (2006.01)  
*C08L 9/00* (2006.01)  
*C08L 9/06* (2006.01)  
*F16F 15/08* (2006.01)  
*C08K 3/06* (2006.01)  
*C08K 3/02* (2006.01)

(52) U.S. Cl.  
CPC .................. *C08L 7/00* (2013.01); *C08K 3/06* (2013.01); *C08K 3/22* (2013.01); *C08L 9/00* (2013.01); *C08L 9/06* (2013.01); *F16F 15/08* (2013.01); *C08K 2003/023* (2013.01); *C08K 2003/2296* (2013.01)

(58) Field of Classification Search  
CPC .... C08L 7/00; C08L 9/06; C08K 3/22; C08K 3/06  
See application file for complete search history.

(56) References Cited

FOREIGN PATENT DOCUMENTS

| JP | 49-130893 A | 12/1974 |
|---|---|---|
| JP | 54-7279 B2 | 4/1979 |
| JP | 60-262841 A | 12/1985 |
| JP | 2001-316527 A | 11/2001 |
| JP | 2006-193621 A | 7/2006 |
| JP | 2009-40902 A | 2/2009 |
| JP | 2010-163516 A | 7/2010 |
| JP | 5476741 B * | 2/2014 |
| JP | 2014-77050 A | 5/2014 |

OTHER PUBLICATIONS

Notification of Transmittal of Translation of the International Preliminary Report on Patentability (Forms PCT/IB/338) issued in counterpart International Application No. PCT/JP2015/052173 dated Aug. 10, 2017 with Forms PCT/IB/373, and PCT/ISA/237. (6 pages).  
International Search Report dated Apr. 21, 2015, issued in counterpart International Application No. PCT/JP2015/052173 (2 pages).

\* cited by examiner

*Primary Examiner* — Peter D. Mulcahy  
(74) *Attorney, Agent, or Firm* — Westerman, Hattori, Daniels & Adrian, LLP

(57) ABSTRACT

A rubber composition for vibration damping rubbers, comprising, a rubber component which comprises at least one selected from the group consisting of natural rubbers and polyisoprene rubbers in an amount of 60 to 95 parts by weight, and which comprises a styrene butadiene rubber in an amount of 5 to 30 parts by weight and a complex zinc flower in an amount of 2 to 10 parts by weight for 100 parts by weight of the rubber component. The complex zinc flower has a nitrogen adsorption specific surface area of 15 to 110 $m^2/g$, a DBP oil absorption amount of 50 to 100 mL/100 g, and a zinc flower concentration of 38 to 64% by weight.

4 Claims, No Drawings

RUBBER COMPOSITION FOR VIBRATION DAMPING RUBBERS, AND VIBRATION DAMPING RUBBER

TECHNICAL FIELD

The present invention relates to a rubber composition for vibration damping rubbers, and a vibration damping rubber, and particularly to a rubber composition for vibration damping rubbers that is usable suitably for vibration damping members such as an engine mount for automobiles, and a vibration damping rubber containing this composition.

BACKGROUND ART

Hitherto, as a vibration damping rubber, a rubber obtained by blending carbon black as a reinforcing material in natural rubber has been used. In recent years, in the market, vibration damping rubbers, particularly, vibration damping rubbers for automobiles have been required to be decreased in dynamic magnification ("dynamic spring constant"/"static spring constant" ratio).

In order to decrease a vibration damping rubber in dynamic magnification, it is important to heighten the dispersibility of carbon black in natural rubber. Hitherto, a method has been adopted in which the dispersibility of carbon black in natural rubber is heightened by using a kind of carbon black having a large particle diameter as carbon black. However, this method tends to damage the vibration damping rubber in endurance.

In general, together with a vulcanizing agent containing sulfur, a vulcanization accelerator is blended in a rubber composition in order to shorten the vulcanizing period, lower the vulcanizing temperature and decrease the amount of the vulcanizing agent. A compound for activating this vulcanization accelerator and making the accelerating effect thereof higher is a metal oxide, a typical example thereof being zinc oxide (zinc flower). Patent Document 1 listed below states that a vibration damping rubber decreased in dynamic magnification can be obtained by vulcanizing a rubber composition obtained by blending a specified amount of zinc flower made into fine particles in 100 parts by weight of natural rubber. However, the inventors have made eager researches to find out that from the viewpoint of a decrease in the dynamic magnification of vibration damping rubbers, there remains room for further improvement in the technique described in this patent document.

Patent Document 2 listed below describes, as a raw material of a pneumatic tire, a rubber composition containing SBR and a complex zinc flower in order to improve various physical properties when the composition is made into the pneumatic tire (for example, the operability and ride quality of an automobile, and the abrasion resistance of the composition) while the thermal aging of the composition is restrained. However, the rubber compositions described in these documents are not intended to be used for vibration damping rubbers. The documents much less state or suggest that the use of the rubber compositions is effective for decreasing the dynamic magnification.

Patent Documents 3 and 4 describe methods for producing complex zinc flower particles, and describe techniques of blending the resultant complex zinc flower in a rubber composition.

PRIOR ART DOCUMENTS

Patent Documents

Patent Document 1: JP-A-2006-193621
Patent Document 2: JP-A-2001-316527
Patent Document 3: JP-A-54-7279
Patent Document 4: JP-A-60-262841

SUMMARY OF THE INVENTION

Problems to be Solved by the Invention

However, the inventors have made eager investigations to find out that in the case of using the complex zinc flower obtained by the production method described in Patent Document 3 or 4, it is difficult to attain compatibility between an increase of a vibration damping rubber in endurance and a decrease thereof in dynamic magnification, which are required in recent years. Furthermore, the techniques described in Patent Documents 3 and 4 have not been developed for vibration damping rubbers, and much less state or suggest that the use of the resultant complex zinc flower is effective for decreasing the dynamic magnification.

In light of the above-mentioned actual situation, the present invention has been made. An object thereof is to provide a rubber composition for vibration damping rubbers and a vibration damping rubber that can each attain compatibility between high endurance and a low-dynamic-magnification property.

Means for Solving the Problems

In order to solve the above-mentioned problems, the inventors have paid attention to the "nitrogen adsorption specific surface area" and the "DBP oil absorption amount" of a complex zinc flower blended in a rubber composition for vibration damping rubbers, and the "zinc flower concentration" in the complex zinc flower, and found out that a vibration damping rubber compatible between high endurance and a low dynamic magnification can be obtained by blending a complex zinc flower optimized in these properties in a rubber composition, and producing the vibration damping rubber using this blend as a raw material. Additionally, the high endurance and the low-dynamic-magnification property of the damping rubber can be further heightened by blending the specified complex zinc flower in a mixed rubber composed of a styrene butadiene rubber, and at least one selected from the group consisting of natural rubbers and polyisoprene rubbers. The present invention has been made as a result of these investigations, and the present invention has attained the above-mentioned object by structures described below.

The present invention relates to a rubber composition for vibration damping rubbers, containing: a rubber component which contains at least one selected from the group consisting of natural rubbers and polyisoprene rubbers in an amount of 60 to 95 parts by weight, and which contains a styrene butadiene rubber in an amount of 5 to 30 parts by weight; and a complex zinc flower in an amount of 2 to 10 parts by weight for 100 parts by weight of the rubber component; wherein the complex zinc flower has a nitrogen adsorption specific surface area of 15 to 110 m$^2$/g, a DBP oil absorption amount of 50 to 100 mL/100 g, and a zinc flower concentration of 38 to 64% by weight. In the rubber composition for vibration damping rubbers according to the present invention, the specified parts by weight of the specified complex zinc flower, which is large in surface area and small in particle diameter and is excellent in dispersibility, is blended in 100 parts by weight of the rubber component, which contains at least one selected from the group consisting of natural rubbers and polyisoprene rubbers and also contains a styrene butadiene rubber. Thus, the finally obtained vulcanized rubber is improved in the high endurance and low-dynamic-magnification property with a good balance.

The rubber composition for vibration damping rubbers preferably contains silica in an amount of 3 to 15 parts by weight for 100 parts by weight of the rubber component. The specified complex zinc flower and silica are combined with each other, and the combination is used in the mixed rubber, which is a mixture of a styrene butadiene rubber, and at least one selected from the group consisting of natural rubbers and polyisoprene rubbers. The use makes an improvement of the finally obtained vulcanized rubber in high endurance and low-dynamic-magnification property with an especially good balance.

The rubber composition for vibration damping rubbers preferably contains sulfur in an amount of 0.1 to 3 parts by weight for 100 parts by weight of the rubber component. A vibration damping rubber obtained by using this rubber composition as a raw material can be decreased in dynamic magnification while maintaining heat resistance and rubber strength.

The vibration damping rubber according to the present invention can be obtained by using the rubber composition for vibration damping rubbers recited in any one of the preceding paragraphs concerned, and vulcanizing and molding the rubber composition. This vibration damping rubber is remarkably decreased in dynamic magnification.

MODE FOR CARRYING OUT THE INVENTION

The rubber composition for vibration damping rubbers according to the present invention contains, for 100 parts by weight of its rubber component, 60 to 95 parts by weight of at least one rubber selected from the group consisting of natural rubbers and polyisoprene rubbers, and 5 to 30 parts by weight of a styrene butadiene rubber. The composition contains the at least one rubber, which is selected from the group consisting of natural rubbers and polyisoprene rubbers, in an amount that is preferably 80 parts by weight or more, more preferably 90 parts or more for 100 parts by weight of the rubber component in order to be decreased in dynamic magnification while a vibration damping rubber obtained by vulcanizing this composition maintains fatigue resistance and others. In the meantime, in order to improve the vulcanized rubber in endurance, the rubber composition contains the styrene butadiene rubber in an amount of 5 to 30 parts by weight for 100 parts by weight of the rubber component.

The rubber composition for vibration damping rubbers according to the present invention contains 2 to 10 parts by weight of a complex zinc flower. The complex zinc flower has a structure in which a core as a carrier into the rubber has, for example, $CaCO_3$, $Ca(OH)_2$, $CaSO_4$, $ZnO$, $MgO$, $Mg(OH)_2$, or $MgCO_3$, and the surface of the core is covered with a zinc flower higher in activity than ordinary zinc flowers. It is allowable to set, at will, for example, the ratio between the size of the core and the thickness of the covering layer of the zinc flower. The content of the complex zinc flower in the rubber composition for vibration damping rubbers is from 2 to 10 parts by weight for 100 parts by weight of the rubber component. The content is preferably from 3 to 7 parts by weight, more preferably from 4 to 6 parts by weight to decrease the vibration damping rubber further in dynamic magnification while improving the vibration damping rubber in endurance.

The complex zinc flower used in the present invention is characterized by having a nitrogen adsorption specific surface area of 15 to 110 $m^2/g$, a DBP oil absorption amount of 50 to 100 mL/100 g, and a zinc flower concentration of 38 to 64% by weight. With reference to, for example, JP-A-54-7279 and JP-A-60-262841, as this complex zinc flower, it is possible to use a complex zinc flower which has, among the cores of the above-mentioned materials such as $CaCO_3$, a core having a core diameter as small as possible. The complex zinc flower can be produced by adjusting the cover amount of zinc flower to set the zinc flower concentration in this complex zinc flower within a range of 38 to 64% by weight. In order to yield a complex zinc flower having a desired nitrogen adsorption specific surface area and a desired DBP oil absorption amount, it is preferred to use, as the core, a core having a core diameter of 0.06 to 0.22 µm, preferably 0.08 to 0.12 µm and made of $CaCO_3$, $Ca(OH)_2$, $CaSO_4$, $ZnO$, $MgO$, $Mg(OH)_2$, or $MgCO_3$. The use of the $CaCO_3$ core is more preferred.

The nitrogen adsorption specific surface area of the complex zinc flower is an index of the particle diameter of the complex zinc flower. The nitrogen adsorption specific surface area and the particle diameter have the relationship that as the particle diameter of the complex zinc flower is smaller, the nitrogen adsorption specific surface area is larger. In order for the resultant vibration damping rubber to attain a low dynamic magnification and high endurance, the nitrogen adsorption specific surface area of the used complex zinc flower is indispensably from 15 to 110 $m^2/g$, preferably from 31 to 106 $m^2/g$, more preferably from 48 to 69 $m^2/g$.

The DBP oil absorption amount of the complex zinc flower is an index of an aggregated structure of particles (development degree of the structure) of the complex zinc flower. As the aggregated structure is further developed, the DBP oil absorption amount tends to become larger. In order for the resultant vibration damping rubber to attain a low dynamic magnification and high endurance, the DBP oil absorption amount of the used complex zinc flower is indispensably from 50 to 100 mL/100 g, preferably from 60 to 80 mL/100 g.

In order for zinc flower of the complex zinc flower to activate a vulcanization accelerator blended in the rubber composition, the zinc flower concentration in the used complex zinc flower is indispensably from 38 to 64% by weight, preferably from 50 to 60% by weight.

The rubber composition for vibration damping rubbers according to the present invention preferably contains a sulfur-based vulcanizing agent. The kind of sulfur as this sulfur-based vulcanizing agent may be any ordinary kind of sulfur for rubbers. Examples thereof include powdery sulfur, precipitated sulfur, insoluble sulfur, and highly dispersible sulfur. The sulfur content in the rubber composition for vibration damping rubbers according to the present invention is preferably from 0.1 to 3 parts by weight for 100 parts by weight of the rubber component. If the sulfur content is less than 0.1 part by weight, the vulcanized rubber is short in crosslinking density to be lowered in rubber strength. If the content is more than 3 parts by weight, the vulcanized rubber is deteriorated, particularly, in heat resistance. In order for the vulcanized rubber to ensure rubber strength satisfactorily and be further improved in dynamic magnification and heat resistance, the sulfur content therein is more preferably from 0.15 to 2.0 parts by weight, even more preferably from 0.15 to 1.5 parts by weight for 100 parts by weight of the rubber component. When the sulfur content in the rubber composition is 0.8 part by weight or less, the vulcanized rubber tends to be deteriorated in dynamic magnification while improved in heat resistance. Accordingly, when the sulfur content in the rubber composition is 0.8 part by weight or less, it is preferred for improving the vulcanized rubber in dynamic magnification to blend the following as the rubber component in the composition: 60 to 80 parts by weight of at least one selected from the group consisting of natural rubbers and polyisoprene rubbers; 10 to 30 parts by weight of a polybutadiene rubber; and 5 to 30 parts by weight of a styrene butadiene rubber.

As far as the advantageous effects of the present invention are not damaged, any compounding agent used ordinarily in the rubber industry may be appropriately blended, together with the above-mentioned rubber component, complex zinc flower and sulfur-based vulcanizing agent, in the rubber composition for vibration damping rubbers of the present invention. Examples of the compounding agent include a vulcanization accelerator, carbon black, silica, a silane coupling agent, stearic acid, a vulcanization accelerator aid, a vulcanization retardant, an antiaging agent, softening agents such as wax and oil, and a processing aid.

The kind of carbon black may be, for example, SAF, ISAF, HAF, FEF or GPF. Carbon black is usable as far as carbon black can adjust rubber properties of the vulcanized rubber, such as the hardness, reinforcing performance, and low exothermic property of the rubber. The carbon black content is preferably from 20 to 120 parts by weight, more preferably from 30 to 100 parts by weight, even more preferably from 30 to 60 parts by weight for 100 parts by weight of the rubber component. If this content is less than 20 parts by weight, the rubber composition cannot gain the reinforcing effect of carbon black sufficiently. If the content is more than 120 parts by weight, the rubber composition is deteriorated in exothermic property, rubber miscibility, processability when processed, and others.

The vulcanization accelerator may be a vulcanization accelerator used usually for rubber vulcanization. Examples thereof include sulfenamide-based, thiuram-based, thiazole-based, thiourea-based, guanidine-based, and dithiocarbamic acid-based vulcanization accelerators. These may be used singly or in an appropriate mixture form. The vulcanization accelerator content is preferably from 1 to 5 parts by weight for 100 parts by weight of the rubber component. The vulcanization accelerator content is preferably adjusted in accordance with the content of sulfur used. Specifically, when the sulfur content is from 0.15 to 0.6 part by weight for 100 parts by weight of the rubber component, the vulcanization accelerator content is preferably from 2.5 to 5 parts by weight. When the sulfur content is from 0.7 to 3 parts by weight, the vulcanization accelerator content is preferably from 1 to 3 parts by weight.

The antiaging agent may be an antiaging agent used usually for rubbers. Examples thereof include aromatic amine-based, amine-ketone-based, monophenolic, bisphenolic, polyphenolic, dithiocarbamic acid-based, and thiourea-based antiaging agents. These may be used singly or in an appropriate mixture form.

The rubber composition for vibration damping rubbers of the present invention can be obtained by kneading the rubber component, complex zinc flower and sulfur-based vulcanizing agent, and optionally carbon black, stearic acid, the vulcanization accelerator, the antiaging agent, wax, and others, using an ordinary kneading machine used in the rubber industry, such as a Banbury mixer, a kneader, or a roller.

The method for blending the individual components together is not particularly limited, and may be, for example, any one of the following: a method of kneading ingredients other than the sulfur-based vulcanizing agent, the vulcanization accelerator, and other vulcanization-related components beforehand to prepare a masterbatch, adding the remaining components thereto, and further kneading these components; a method of adding the individual components in any order to a machine as described above, and then kneading the components; and a method of adding all the components simultaneously to the machine, and then kneading the components.

After the kneading of the individual components, the resultant is molded, and then the molded body is vulcanized. In this way, a vibration damping rubber having a low dynamic magnification can be produced. This vibration damping rubber is usable suitably for vibration damping rubbers for automobiles, for example, for their engine mounts, torsional dampers, body mounts, member mounts, strut mounts and muffler mounts, and suitably for vibration damping rubbers for railway vehicles, and vibration damping rubbers for industrial machines. The vibration damping rubber is particularly useful as a constituent member of vibration damping rubbers for automobiles, e.g., for their engine mounts, which are required to show a low dynamic magnification.

EXAMPLES

Hereinafter, working examples of the present invention will be specifically described.
(Preparation of Rubber Composition)
In accordance with a formulation in Table 2, a rubber composition of each of Examples 1 to 10 and Comparative Examples 1 to 3 was blended in 100 parts by weight of a rubber component. An ordinary Banbury mixer was used to knead the blend to prepare a rubber composition. The individual compounding agents shown in Table 2 are shown below.
a) Rubber component
  Natural rubber (NR): "RSS#3"
  Polyisoprene rubber (IR): "IR2200" (manufactured by JSR Corporation)
  Styrene butadiene rubber (SBR): "Nipol NS116G" (manufactured by Zeon Corporation)
  Polybutadiene rubber: "CB22" (manufactured by LANXESS GmbH)
b) Carbon black (GPF): "SEAST V" (manufactured by Tokai Carbon Co., Ltd.)
c) Aroma oil: "JOMO NC140" (manufactured by JX Nikko Nisseki Energy)
d) Zinc flower: "No. 3 ZnO"
e) Complex zinc flowers:
  Complex Zinc Flowers (A) to (G)
  On the basis of a method known to those skilled in the art, complex zinc flowers (A) to (G) were each produced by covering a core made of calcium carbonate and having a core diameter shown in Table 1 with zinc flower. In Table 1 are shown the nitrogen adsorption specific surface area ($m^2/g$), the average particle diameter ($\mu m$), and the DBP oil absorption amount (mL/100 g) of each of the produced complex zinc flowers, and the zinc flower concentration (% by weight) in the complex zinc flower. The nitrogen adsorption specific surface area of the produced complex zinc flower was measured on the basis of ASTM D6556, the average particle diameter of the complex zinc flower was calculated on the basis of the measured result of the nitrogen adsorption specific surface area on the supposition that the complex zinc flower was in the form of spheres. The DBP oil absorption amount was measured on the basis of ASTM D2414, and the zinc flower concentration was measured on the basis of elementary analysis using ICP-AES. The core diameter of calcium carbonate can be calculated from the calculated average particle diameter of the complex zinc flower, and the zinc flower concentration.

TABLE 1

| | Core material | Core diameter (μm) | Average particle diameter (μm) | Nitrogen adsorption specific surface area (m²/g) | DBP oil absorption amount (mL/100 g) | Zinc flower concentration (% by weight) |
|---|---|---|---|---|---|---|
| Zinc flower | — | — | — | 0.60 | 3 | 39 | 100 |
| Complex zinc flower (A) | Calcium carbonate | 0.07 | 0.08 | 106 | 98 | 64 |
| Complex zinc flower (B) | Calcium carbonate | 0.09 | 0.10 | 69 | 70 | 58 |
| Comple zinc flower (C) | Calcium carbonate | 0.10 | 0.12 | 54 | 52 | 59 |
| Complex zinc flower (D) | Calcium carbonate | 0.14 | 0.16 | 31 | 71 | 60 |
| Complex zinc flower (E) | Calcium carbonate | 0.11 | 0.13 | 48 | 75 | 51 |
| Complex zinc flower (F) | Calcium carbonate | 0.11 | 0.12 | 57 | 85 | 38 |
| Complex zinc flower (G) | Calcium carbonate | 0.20 | 0.24 | 16 | 53 | 60 | f) Stearic acid (manufactured by NOF CORPORATION)
g) Wax: "OZOACE 2701" (manufactured by NIPPON SEIRO CO., LTD.)
h) Antiaging agent:
  N-(1,3-dimethylbutyl)-N'-phenyl-p-phenylenediamine "ANTAGE 6C" (manufactured by Kawaguchi Chemical Industry Co., Ltd.)
i) Sulfur: 5%-oil-treated sulfur
j) Vulcanization accelerator
  (A) Thiuram Compound: tetramethylthiuram monosulfide "NOCCELER TS (TS-P)" (manufactured by Ouchi Shinko Chemical Industrial Co., Ltd.)
  (B) Sulfenamide-based vulcanization accelerator: N-cyclohexyl-2-benzothiazolylsulfenamide "NOCCELER CZ-G (CZ)" (manufactured by Ouchi Shinko Chemical Industrial Co., Ltd.)
  (C) Thiazole-based vulcanization accelerator: di-2-benzothiazolyl disulfide "NOCCELER DM-P (DM)" (manufactured by Ouchi Shinko Chemical Industrial Co., Ltd.)
k) Silica: "TOKUSIL USG-SL" (manufactured by Tokuyama Corp.)
l) Silane coupling agent: "Si69" (manufactured by Degussa AG)

(Evaluation)

A predetermined mold was used to heat and vulcanize each of the rubber compositions at 160° C. for 20 minutes to yield a rubber. The rubber was evaluated.

<Dynamic Magnification ("Dynamic Spring Constant"/"Static Spring Constant" Ratio)>

The dynamic magnification of the rubber was calculated by measuring the dynamic spring constant and the static spring constant thereof.

(1) Dynamic Spring Constant (Kd)

A measuring instrument "SERVOPULSER EHF-E Series" manufactured by Shimadzu Corporation was used, and the dynamic spring constant was calculated in accordance with a calculation method described in JIS K 6394 at an initial strain of 10%, a frequency of 100 Hz, and an amplitude of ±0.05 mm.

(2) Static Spring Constant (Ks)

The measuring instrument "SERVOPULSER EHF-E Series" manufactured by Shimadzu Corporation was used, and a test piece, 50 mm in diameter and 25 mm, obtained from the vulcanized rubber was preliminarily compressed between 0 to 5 mm at a cross head speed of 0.7 mm/s. This compression was repeated two times. Next, the piece was fully compressed once between 0 to 5 mm at a cross head speed of 0.167 mm/s. A load-deflection curve chart of the rubber in the third compression was drawn, and the static spring constant thereof was calculated on the basis of the following expression (1):

$$\text{"Dynamic spring constant (N/mm)"} = (w2-w1)/(\delta 2 - \delta 1) \quad (1)$$

wherein w1: the load (N) when the flexible volume δ1 was 1.3 mm; and w2: the load (N) when the flexible volume δ2 was 3.8 mm.

On the basis of the calculated dynamic spring constant (Kd) and static spring constant (Ks), the dynamic magnification (Kd/Ks ratio) was calculated. The evaluation results are shown in Table 2.

<Endurance>

Each of the rubber compositions was subjected to transfer molding to yield a predetermined columnar structure (30 in diameter×20 in H). This structure was inclined at 550. Upward and downward load-applied vibrations (upward load: 0.9 kN; and downward load: 0.3 kN) was applied thereto at a frequency of 3 Hz. The endurance of the structure was evaluated on the basis of the number of the applied vibrations causing cracks to be grown in the structure to lower the spring of the structure to ½ of the initial value. The evaluation was made, using an index obtained when the value of Comparative Example 1 was regarded as 100. As the numerical number is higher, the rubber is better in endurance. The results are shown in Table 2.

<Rubber Hardness and Tensile Property>

In accordance with JIS-K 6253, a type A durometer was used to measure the hardness of the rubber. Furthermore, about a sample of the rubber which was produced using a JIS No. 3 dumbbell, the tensile strength (TB (MPa)) and the elongation (EB (%)) thereof were measured. The results are shown in Table 2.

TABLE 2

|  | Comparative Example 1 | Comparative Example 2 | Example 1 | Example 2 | Example 3 | Example 4 | Example 5 |
|---|---|---|---|---|---|---|---|
| <Blend> | | | | | | | |
| Natural rubber (NR) | 100 | 90 | 90 | 90 | 90 | 90 | 90 |
| Polyisoprene rubber (IR) | — | — | — | — | — | — | — |
| Polybutadiene rubber (BR) | — | — | — | — | — | — | — |
| Styrene butadiene rubber (SBR) | — | 10 | 10 | 10 | 10 | 10 | 10 |
| Carbon black | 45 | 45 | 45 | 45 | 45 | 45 | 45 |
| Silica | — | 5 | 5 | 5 | 5 | 5 | 5 |
| Silane coupling agent | — | 0.4 | 0.4 | 0.4 | 0.4 | 0.4 | 0.4 |
| Aroma oil | 4 | 4 | 4 | 4 | 4 | 4 | 4 |
| Zinc oxide | 5 | 5 | — | — | — | — | — |
| Complex zinc flower (A) | — | — | 5 | — | — | — | — |
| Complex zinc flower (B) | — | — | — | 5 | — | — | — |
| Complex zinc flower (C) | — | — | — | — | 5 | — | — |
| Complex zinc flower (D) | — | — | — | — | — | 5 | — |
| Complex zinc flower (E) | — | — | — | — | — | — | 5 |
| Complex zinc flower (F) | — | — | — | — | — | — | — |
| Complex zinc flower (G) | — | — | — | — | — | — | — |
| Stearic acid | 1 | 1 | 1 | 1 | 1 | 1 | 1 |
| Wax | 1 | 1 | 1 | 1 | 1 | 1 | 1 |
| Antiaging agent | 1.5 | 1.5 | 1.5 | 1.5 | 1.5 | 1.5 | 1.5 |
| Sulfur | 1 | 1 | 1 | 1 | 1 | 1 | 1 |
| Vulcanization accelerator (A) | 0.3 | 0.3 | 0.3 | 0.3 | 0.3 | 0.3 | 0.3 |
| Vulcanization accelerator (B) | 1.7 | 1.7 | 1.7 | 1.7 | 1.7 | 1.7 | 1.7 |
| Vulcanization accelerator (C) | — | — | — | — | — | — | — |
| <Evaluation> | | | | | | | |
| TB (MPa) | 16.2 | 24.4 | 17.9 | 21.2 | 23.8 | 24.6 | 17.7 |
| EB (%) | 360 | 510 | 380 | 430 | 490 | 510 | 370 |
| JIS A rubber hardness | 54 | 54 | 56 | 56 | 54 | 54 | 55 |
| Ks (N/mm) | 495 | 498 | 507 | 510 | 503 | 495 | 502 |
| Dynamic magnification (Kd/Ks ratio) | 1.46 | 1.62 | 1.49 | 1.41 | 1.40 | 1.49 | 1.45 |
| Endurance index | 100 | 128 | 130 | 140 | 138 | 133 | 130 |

|  | Example 6 | Example 7 | Example 8 | Example 9 | Example 10 | Comparative Example 3 |
|---|---|---|---|---|---|---|
| <Blend> | | | | | | |
| Natural rubber (NR) | 90 | 90 | 90 | 90 | — | — |
| Polyisoprene rubber (IR) | — | — | — | — | 70 | 70 |
| Polybutadiene rubber (BR) | — | — | — | — | 20 | 20 |
| Styrene butadiene rubber (SBR) | 10 | 10 | 10 | 10 | 10 | 10 |
| Carbon black | 45 | 45 | 45 | 45 | 45 | 45 |
| Silica | 5 | 5 | 5 | 5 | 5 | 5 |
| Silane coupling agent | 0.4 | 0.4 | 0.4 | 0.4 | 0.4 | 0.4 |
| Aroma oil | 4 | 4 | 4 | 4 | 4 | 4 |
| Zinc oxide | — | — | — | — | — | 5 |
| Complex zinc flower (A) | — | — | — | — | — | — |
| Complex zinc flower (B) | — | — | 2 | 10 | — | — |
| Complex zinc flower (C) | — | — | — | — | — | — |
| Complex zinc flower (D) | — | — | — | — | — | — |
| Complex zinc flower (E) | — | — | — | — | — | — |
| Complex zinc flower (F) | 5 | — | — | — | — | — |
| Complex zinc flower (G) | — | 5 | — | — | 5 | — |
| Stearic acid | 1 | 1 | 1 | 1 | 1 | 1 |
| Wax | 1 | 1 | 1 | 1 | 1 | 1 |
| Antiaging agent | 1.5 | 1.5 | 1.5 | 1.5 | 1.5 | 1.5 |
| Sulfur | 1 | 1 | 1 | 1 | 0.2 | 0.2 |
| Vulcanization accelerator (A) | 0.3 | 0.3 | 0.3 | 0.3 | 0.6 | 0.6 |
| Vulcanization accelerator (B) | 1.7 | 1.7 | 1.7 | 1.7 | — | — |
| Vulcanization accelerator (C) | — | — | — | — | 4 | 4 |
| <Evaluation> | | | | | | |
| TB (MPa) | 21.5 | 24.4 | 20.4 | 19.2 | 20.3 | 19.9 |
| EB (%) | 440 | 500 | 460 | 410 | 530 | 520 |
| JIS A rubber hardness | 55 | 55 | 55 | 57 | 57 | 58 |
| Ks (N/mm) | 502 | 503 | 501 | 523 | 471 | 491 |
| Dynamic magnification (Kd/Ks ratio) | 1.57 | 1.51 | 1.48 | 1.43 | 1.41 | 1.54 |
| Endurance index | 134 | 129 | 137 | 114 | 119 | 116 |

From the results in Table 2, it is apparent that the vulcanized rubber of each of the rubber compositions for vibration damping rubbers according to Examples 1 to 10 is decreased in dynamic magnification and improved in endurance.

The invention claimed is:

1. A rubber composition for vibration damping rubbers, comprising:
   a rubber component which comprises at least one selected from the group consisting of natural rubbers and polyisoprene rubbers in an amount of 60 to 95 parts by weight, and which comprises a styrene butadiene rubber in an amount of 5 to 30 parts by weight; and
   a complex zinc flower in an amount of 2 to 10 parts by weight for 100 parts by weight of the rubber component;
   wherein the complex zinc flower has a nitrogen adsorption specific surface area of 15 to 110 $m^2/g$, a DBP oil absorption amount of 50 to 100 mL/100 g, and a zinc flower concentration of 38 to 64% by weight.

2. The rubber composition for vibration damping rubbers according to claim 1, comprising silica in an amount of 3 to 15 parts by weight for 100 parts by weight of the rubber component.

3. The rubber composition for vibration damping rubbers according to claim 1, comprising sulfur in an amount of 0.1 to 3 parts by weight for 100 parts by weight of the rubber component.

4. A vibration damping rubber, obtained by using the rubber composition for vibration damping rubbers recited in claim 1, and vulcanizing and molding the rubber composition.

* * * * *